United States Patent [19]

Williams et al.

[11] 3,911,871

[45] Oct. 14, 1975

[54] FLUID INJECTION SYSTEM FOR INTERNAL COMBUSTION ENGINES

[75] Inventors: Elmer A. Williams, Gardena; Roger B. Walker, Northridge, both of Calif.

[73] Assignee: Rockwell International Corporation, El Segundo, Calif.

[22] Filed: Jan. 23, 1974

[21] Appl. No.: 435,804

[52] U.S. Cl. .......... 123/25 K; 123/25 L; 123/25 M; 123/25 N; 123/131

[51] Int. Cl.$^2$ .......... F02D 19/00

[58] Field of Search ... 123/25 K, 25 L, 25 M, 25 N, 123/137

[56] References Cited

UNITED STATES PATENTS

| | | | |
|---|---|---|---|
| 1,086,634 | 2/1914 | Wright | 123/25 L |
| 1,279,685 | 9/1918 | Guthrie | 123/25 L |
| 1,295,387 | 2/1919 | Thornberry | 123/25 M |
| 1,320,500 | 11/1919 | Secor | 123/25 L |
| 1,335,391 | 3/1920 | Rayfield | 123/25 K |
| 1,494,261 | 5/1924 | Loetscher | 123/25 M |
| 1,580,962 | 4/1926 | Christison | 123/25 K |
| 1,941,761 | 1/1934 | Roth | 123/25 K |
| 2,922,408 | 1/1960 | Humphries | 123/25 N |
| 3,631,843 | 1/1972 | Yeiser | 123/25 L |
| 3,655,169 | 4/1972 | Goldfarb | 123/25 L |

*Primary Examiner*—Charles J. Myhre
*Assistant Examiner*—Daniel J. O'Connor
*Attorney, Agent, or Firm*—Charles T. Silberberg

[57] ABSTRACT

A system for adding fluid such as water or other combustion effecting fluid to the intake system of an internal combustion engine to utilize expansion of such fluid into steam by the fuel to increase power and/or to reduce smog-producing exhaust emissions. The fluid is pumped into the intake only during certain engine operating conditions. In one embodiment, a normally closed valve or valves is opened in response to the sensing means to allow fluid flow into the intake system. In another embodiment, a means for receiving the input signals from the sensing means and transmitting a signal to open a normally closed valve in response to the input signals when engine operating conditions are within a certain range allows the fluid to be injected into the intake system. A novel means for dispersing the injected fluid in the intake system is also disclosed.

22 Claims, 5 Drawing Figures

FLUID INJECTION SYSTEM FOR INTERNAL COMBUSTION ENGINES

BACKGROUND OF THE INVENTION

This invention relates generally to systems for injecting fluid into the intake system of an internal combustion engine, to modify the combustion of the fuel so as to increase power and/or reduce smog producing emissions. The fluid used is preferably water. The present invention more particularly concerns injecting the fluid into the intake only during certain engine operating conditions to reduce unnecessarily high combustion temperature. No fluid is added when these conditions are not met. Other systems have been devised for injecting water into the intake system. For example, U.S. Pat. No. 2,676,577 to Vanderpoel, in which fluid in a supply tank is pressurized by the exhaust manifold pressure, and is valved to the intake under control of the intake manifold vacuum. In U.S. Pat. No. 3,631,843 to Yeiser, fluid is pumped to the intake at a rate proportional to engine speed and inversely proportional to intake manifold vacuum. These patents illustrate the need for such a system which can be adopted for retrofit to existing engines at a reasonable cost with consequent increase in power and decrease in smog producing emissions. However, these inventions have not met the desired objectives. By constant injection of water into the intake system while the engine is running, a very large fluid supply tank, with consequent cost and space problems, is necessitated. A very complicated valve or an expensive pump is required. Fluid, rather than being injected when necessitated by engine operating conditions, is injected in proportion to fuel flow rate. Significantly, because the injected water could not in the prior art devices be converted to steam quickly enough, the excess water has actually hindered performance and increased the smog producing exhaust emission under certain conditions. This problem is particularly noticeable with the prior art devices during acceleration when the maximum amount of water is injected.

SUMMARY OF THE INVENTION

It is, therefore, an object of the present invention to provide a relatively simple, inexpensive fluid injection system that improves performance and lessens harmful exhaust emissions.

It is another object of the present invention to provide a fluid injection system where the fluid is injected into the intake system selectively, only under certain engine operating conditions.

It is yet another object of the present invention to provide a water injection system wherein water injected into the intake system of the internal combustion engine is more easily converted into steam.

Briefly, in accordance with the invention, there is provided an apparatus for the addition of a cooling fluid into the intake system of an internal combustion system. Fluid from a supply container is selectively injected into the intake system depending upon engine operating conditions. The invention employs a sensing means which under certain engine operating conditions transmits a signal to open a normally closed valve. This allows fluid from the supply container to be injected into the intake system of the engine while the valve is open. When engine operating conditions fall out of the specified range, the sensing means no longer transmits a signal, and the valve closes shutting off the fluid flow.

One form of the invention employs a second valve which is required to be open for fluid flow. This valve is open only at high intake vacuum. As an alternative the second valve can be designed to open at high and low intake vacuum. A means to close the first valve when throttle pressure is removed can also be included in this form of the invention.

Another form of the invention employs a means for receiving the input signals from the sensing means which transmits a signal to open the normally closed valve under the specified engine operating conditions. Again, a second valve designed to open only at high vacuum or at high and low vacuum which is also required to be open to allow water injection can be included.

In the above forms of the invention a novel means for dispersing the injected fluid into the intake system can optimally be utilized. An ultrasonic atomizer which atomizes the injected fluid is so employed.

Other objects and advantages of the invention will become apparent upon reading the following detailed description and upon reference to the drawings.

While the invention will be described in connection with preferred embodiments, it will be understood that it is not intended to limit the invention to those embodiments. On the contrary, it is intended to cover all alternatives, modifications, and equivalents that may be included within the spirit and scope of the invention as defined by the appended claims.

DETAILED DESCRIPTION OF THE INVENTION

Figure 1:
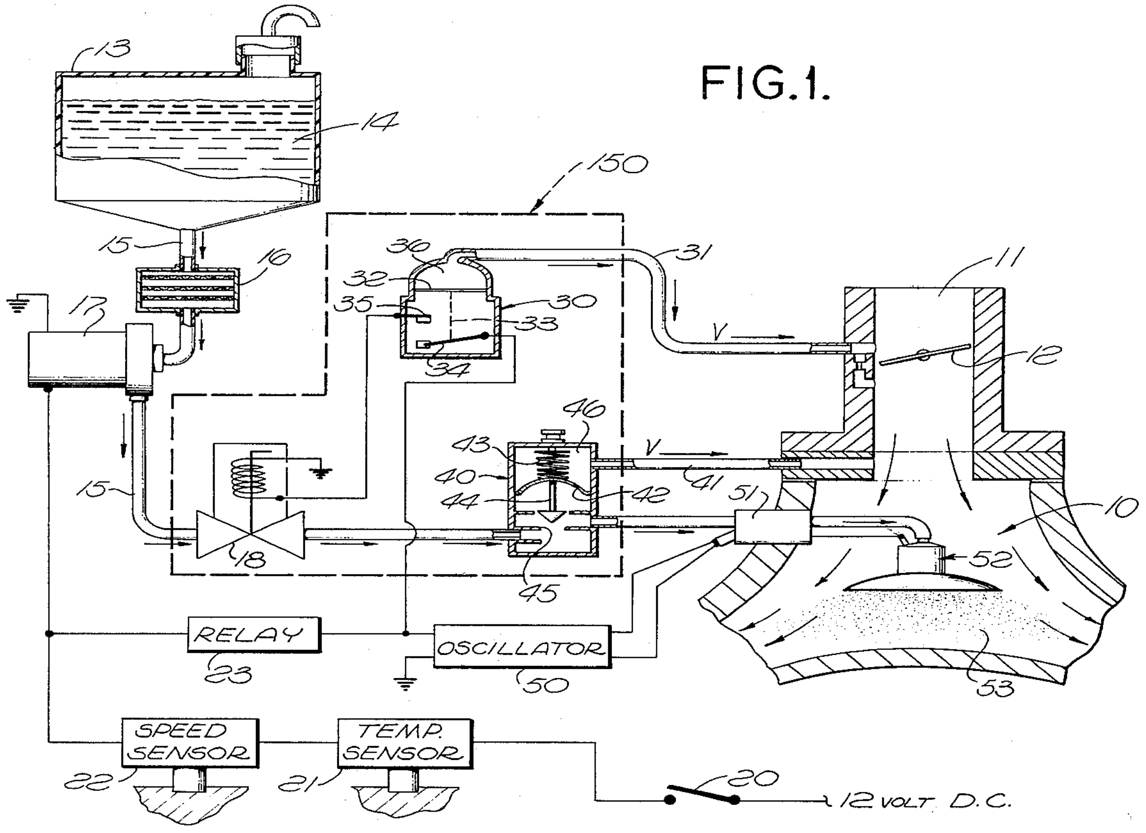
FIG. 1 is a diagram of the liquid injection system incorporating a first embodiment of the invention.

Turning first to FIG. 1, combustion air flows into the intake manifold 10 of an internal combustion engine of any suitable type. Air flows in the direction of the arrows through air inlet 11 by throttle butterfly valve 12 into the intake manifold 10. The butterfly valve 12 is controlled by the throttle (not shown). The amount the butterfly valve opens is directly proportional to the pressure on the throttle.

The fluid to be injected into the intake system of the engine is indicated at 14 and is contained in tank 13. The fluid used is preferably water, with or without the addition of hydrogen peroxide, alcohol and/or other nontoxic additives. The fluid supply container 13 may be suitably positioned anywhere upon the internal combustion engine or the vehicle powered by such engine, and may be mounted by suitable straps or by any other desired means. Preferably the tank is made of a plastic type material and has a vented cylinder cap. The storage tank 13 can be of any desired shape to meet space requirements. The storage tank need not be as large as the prior art requires because in the present invention water is only added during specified necessary conditions.

Tubing or piping 15 is utilized to pass the fluid from tank 13 through the elements of the system into the intake manifold 10. As shown in the drawing, the tubing 15 is preferably connected to an outlet at the lowest point of tank 13. This will aid in gravity feed of the fluid to the intake manifold should that be desired. If gravity feed is utilized, the storage tank 13 should be located at a higher level than the other elements of the system. It should be noted that manifold vacuum would aid in drawing fluid from the tank 13.

For removing any particles or impurities in the fluid, a filter 16 is provided. The filter 16 is preferably a multiple screen type applicable for water usage with cleaning or screen replacing characteristics.

Downstream of the filter is located a pump 17 when required. Preferably pump 17 is a centrifugal type suitable for water use. The pump is driven by an electric motor. Exact specifications of the pump and motor will vary due to tank location, but generally no more than a five gallon per hour constant pumping rate is required.

A means 150 for controlling the periods of injection of water into the intake manifold is provided. This can consist of valve 18, which is a 12v. D. C. solenoid shutoff valve that is normally closed, thereby preventing fluid injection.

Downstream of the first valve is shown a second valve 40 which may be provided in means 150. This valve is normally closed and designed to open and allow fluid injection into the intake manifold only during conditions of high vacuum. Valve stem 44 which is secured to diaphram 42 normally seats at 45 by virtue of spring 43 bearing down on the diaphram 42. Tubing 41 provides a passage from the diaphram chamber 46 to the intake manifold 10. Thus, when manifold vacuum is high enough, the spring force will be overcome and the diaphram 42 and valve stem 44 will move up opening the valve for fluid flow. Valve 40 can be designed to be fully open when a specified vacuum pressure is reached and closed otherwise, or for the extent of opening to vary as presently illustrated depending upon the amount of vacuum pressure. Thus, as shown, when a certain vacuum is reached, as 16 in. HG, the normally closed valve will begin to open. As vacuum increases the valve will open further allowing a greater fluid flow until it is open to the maximum extent. If vacuum decreases, the spring force will move the diaphram 42 and valve stem 44 downward decreasing the valve orifice and fluid flow.

A means to disperse the injected fluid in the intake manifold, generally indicated at 52, is located in the center plenum area and mounted from an adapter 51 suitably attached to the manifold wall. In accordance with a further aspect of the invention, this means 52 is shown as an ultrasonic atomizer for atomizing the fluid particles 53 injected into the intake manifold.

For controlling valve 18 so that fluid is selectively injected, sensors 21 and 22 are provided. For purposes of illustration engine temperature and vehicle speed were chosen as the variables used for control of valve 18. If valve 40 is not used in the system, these variables would then control exclusively whether or not injection would take place. Other variables such as engine RPM could also have been used. Transmission gear position could be substituted for vehicle speed as a parameter, they being equivalent for purposes of this application. The sensors function as on-off switches with a fixed threshold value is reached. For example temperature sensor 21 might have a threshold value of 185°F. and speed sensor 22 a threshold value of 30 miles per hour. No current from the battery will pass through the temperature sensor 21 until the engine temperature reaches a 185°F and no current will pass through the speed sensor until the vehicle reaches 30 miles per hour and the current is passed through the temperature sensor. Thus, no signal to open valve 18 will reach that valve until current passes through both sensors. The signal is shut off and the valve closed when one of the variables falls below the threshold value.

Relay 23 is provided to allow power to start the pump 17, if applicable, prior to energizing valve 18 and oscillator 50 simultaneously. Oscillator 50 is provided to deliver an alternating current to atomizer 52.

In order to prevent water injection during deceleration of the vehicle when throttle pressure is removed, a switch 30 can be used in means 150. Diaphram 32 is connected by any suitable means 33 to the lower switch contact 34. Access from the diaphram chamber 36 to the air intake portion 11 is provided by tubing 31. Switch 30 is operated by this ported vacuum and functions in relation to the throttle-butterfly condition. As long as the throttle pedal is depressed any amount, the vacuum in chamber 36 is sufficient to keep the diaphram 32 and lower switch contact 34 in contact with the upper switch contact 35. A generated signal could then pass through switch 30 to reach valve 18. If throttle pressure is removed, vacuum is insufficient to keep the diaphram in an upward position and the switch contact is broken. This prevents any signal being transmitted to valve 18.

Figures 2, 3:
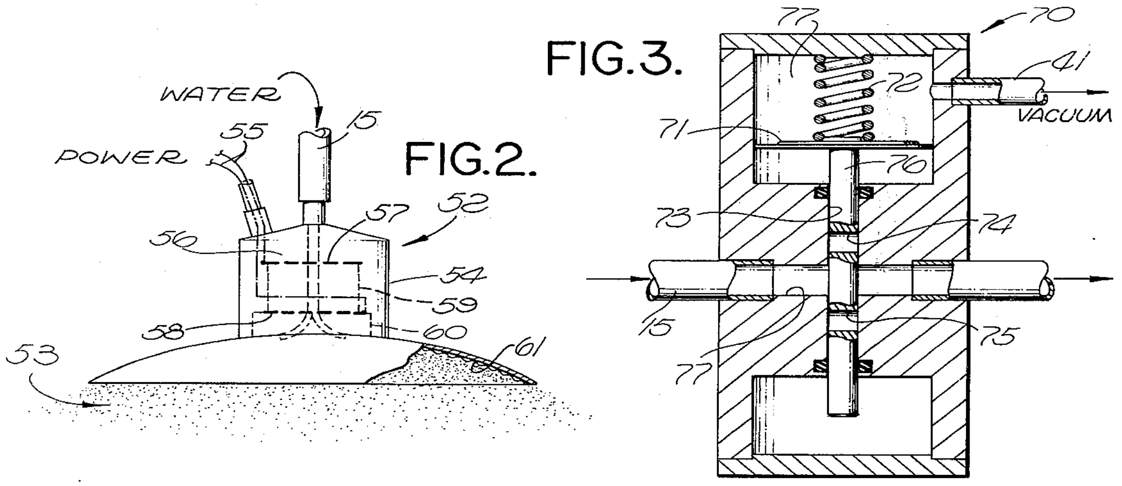
FIG. 2 is a diagram of a liquid dispersing means.
FIG. 3 is a sectional view of an alternate vacuum control valve arrangement.

FIG. 2 illustrates an ultrasonic atomizer 52 used to disperse the injected fluid in the intake manifold. The fluid to be injected, such as water, passes through tubing 15 into the atomizer 52. Water is transmitted through portion 54 to the atomizing surface 61 where it forms into droplets. Alternating circuit is brought into the atomizer from oscillator 50 through lines 55 which are electrically connected to electrodes 57 and 58 which surround a piezoelectric crystal 59. The piezoelectric crystal 59 is cemented to a restraining portion 56 to prevent expansion of the crystal in that direction. The piezoelectric element 59 is suitably connected to a member 60 which transmits vibration of the piezoelectric element 59 to the atomizing surface 61.

In operation, the alternating current causes the piezoelectric crystal to expand and contract at an ultrasonic frequency. This vibration is transmitted through member 60 to the atomizing surface 61. The vibration of the atomizing surface 61 breaks the surface tension of the water droplets that have formed on the atomizing surface 61. The water droplets are thereby broken up into much smaller particles 53 and dispersed into the intake manifold.

It should be understood that FIG. 2 is used for purposes of illustration, and the dimensions need not be proportional. Because the injected water is dispensed into the intake manifold in the form of a mist of small particles, it is far more easily expanded into steam. This obviates the problem of unexpanded liquid hindering the combustion process with consequent reduction in power and increase in harmful emissions.

FIG. 3 illustrates an alternate arrangement for valve 40 which allows injection of water into the intake manifold during ranges of high and low vacuum. In the form shown a valve 70 has a diaphram chamber 77. Diaphram 71 has a valve rod 76 connected thereto. Valve rod 76 is positioned in bore 73. Disposed in the valve rod 76 are apertures 74 and 75. Tubing 15 transmitting a fluid to be injected, is connected to both ends of an axially disposed central conduit 77. Spring 72 bears against the diaphram 71 such that at low vacuum, as 5 in. HG, valve rod 76 is positioned with aperture 74 axially aligned with conduit 77, thereby allowing fluid to flow through the valve. As vacuum increases, the spring tension is overcome by the difference in pressure across the diaphram and valve rod 76 moves in an upward direction. Depending upon the amount of differential pressure, fluid flow through the valve will be lessened or cut off by virtue of the solid portion of rod 76 blocking conduit 77. When vacuum is sufficiently high, as 16 in. HG, the differential pressure across the diaphram will be great enough to overcome the spring tension to the point where rod 76 is in a position where aperture 75 is in axial alignment with conduit 77, thereby allowing fluid flow through valve 70. It can, therefore, be seen that position of valve rod 76 will vary depending on vacuum pressure with water passage through the valve during periods of high and low vacuum. The location and size of the apertures in valve rod 76 and the tension in spring 72 can be designed to accomodate specified ranges of high and low vacuum.

Figure 4:
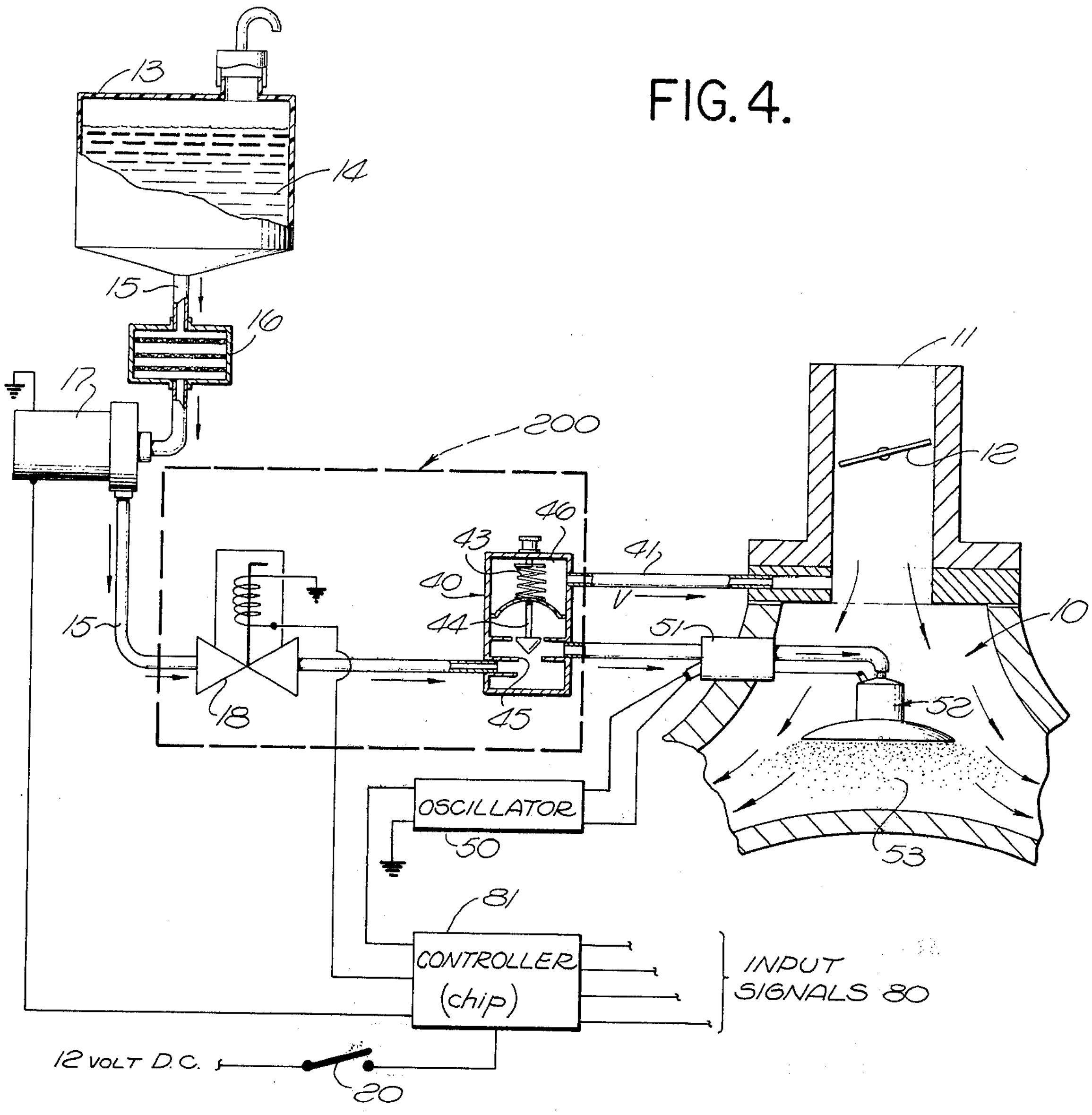
FIG. 4 is a diagram of a second embodiment of the system.

FIG. 4 illustrates a modification of the invention. The crux of the modification is the control of valve 18 for the selective injection of the fluid into the intake manifold. A controller 81 receives input signals 80 from sensing devices which correspond to selected engine operating conditions. The controller 81 is an electronic control unit which is adapted to receive the input signals and to transmit a pulse to pump 17, valve 18, and oscillator 50 under certain conditions. The controller 81 could also have additional functions as when the system of this invention is used in an emission control system which utilizes fuel injection. Thus, the controller would additionally have circuits for converting signals from the input sensors to electrical pulses to open injection valves 120 with a specified timing and duration. Such circuits are well known in the prior art.

When the input signals are at certain specified levels, the controller transmits a signal to the pump 17, and then to the valve 18 and oscillator 50. Fluid would then be injected into the intake manifold unless means 200 for controlling the periods of injection of water into the intake manifold, includes in addition to valve 18, a means such as valve 40 or valve 70 and which are in a closed position.

Figure 5:
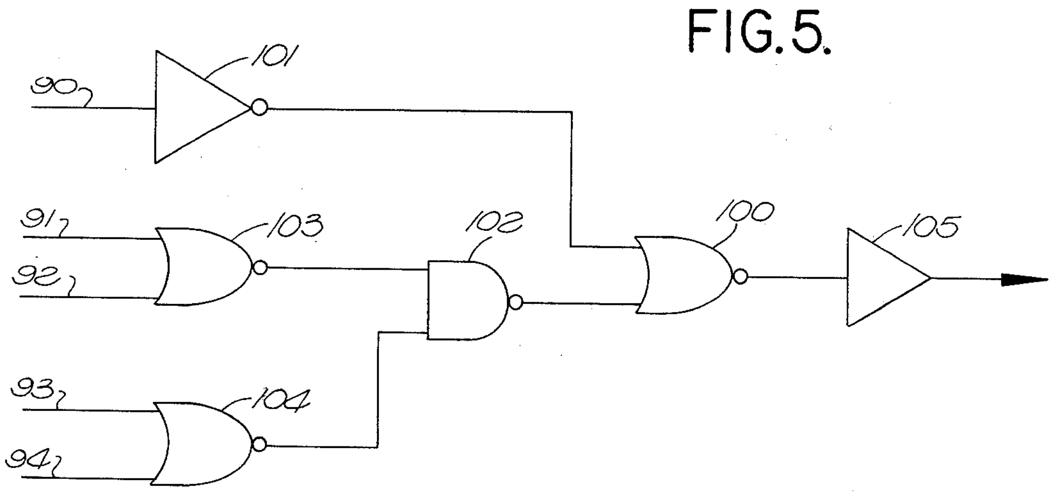
FIG. 5 shows one type of control circuit, in logic schematic form, for the second embodiment.

A logic circuit which can be used for the controller is illustrated in FIG. 5. Connections 90, 91, 92, 93 and 94 transmit input signals from the sensors. In the preferred embodiment, 90 represents the engine RPM signal, 91 engine temperature, 92 throttle position, 93 engine speed, and 94 manifold vacuum. Each sensor produces either a binary 1 or binary 0 output depending upon its threshold value and the engine operating condition sensed. For example, with engine temperature having a threshold value of 140°F, a binary 1 output will be produced until the threshold value is exceeded, whereupon a binary 0 output is produced. Other representative threshold values are 30 miles per hour for engine speed, 16 in. HG for manifold vacuum, 1500 RPM for engine RPM, and zero for throttle position (as long as there is throttle pressure and the butterfly is partially open, the threshold value of zero will be exceeded and a zero binary output will be produced). In the form shown, engine RPM 90 will produce a binary 1 output when its threshold value is exceeded, whereas the other sensor signals are binary 0 when the threshold value of the sensors is exceeded. The circuit is designed so that an output signal is produced only if signal 90 is a binary 1 and signals 91, 92, 93 and 94 are binary 0. NOR gate 100 will not produce a true signal unless both its input signals are binary 0. By virtue of inverter 101 a binary 0 input into NOR gate 100 will not be produced unless the inverter receives a binary 1 input signal from the engine RPM sensor. This occurs only when engine RPM is greater than the threshold value of 1500 RPM. For the other inputs to NOR gate 100 to be a binary 0 signal, NAND gate 102 must have both its inputs as binary 1. For both these inputs to the NAND gate 102 to be binary 1, each of the two inputs to NOR gates 103 and 104 must be binary 0. Each of these input signals will be binary 0 only when each of the threshold values of each of the respective sensors is exceeded. Thus a signal is produced by NOR gate 100 only when the threshold values of all the sensors is exceeded. The output of NOR gate 100 is connected to amplifier 105 which, in turn, supplies controlling current to pump 17, valve 18, and oscillator 50. A time delay relay (not shown) can be used to delay the signal to oscillator 50 and valve 18 until after pump 17 is energized. The signal produced will be terminated when any one or more of the engine operating conditions sensed falls below its threshold value. Thus, water injection takes place on an intermittent selected basis depending on engine operating conditions.

OPERATION

In the embodiment illustrated in FIG. 1, no water injection can take place until the threshold values of sensors 21 and 22 are exceeded and ignition switch 20 is closed. Once this takes place pump 17 is energized drawing fluid 14 from container 13 through filter 16 to valve 18. Valve 18 would then open in response to a signal unless the switch 30 was open. Switch 30 is open only during periods when no throttle pressure is present. If switch 30 is closed valve 18 will open allowing fluid to pass to valve 40 or 70. This valve will be open, depending on the valve selected, at only high vacuum or high and low vacuum. When open, water will pass through the valve into the atomizer 52, where it is atomized into small particles 53 in the intake manifold 10.

The embodiment of FIG. 4 operates in the same manner except pump 17, valve 18, and oscillator 50 are controlled exclusively by controller 81. Thus, no water can be injected until all input signals to the controller exceed their threshold values. Once this occurs pump 17 is energized drawing fluid from the tank 13 through filter 16, and through valve 18 to valve 40 or valve 70. If manifold vacuum is within the design ranges, this valve will be open allowing fluid into the atomizer 52 where it is injected as small particles 53 into the intake manifold 10.

Thus, it is apparent that there has been provided, in accordance with the invention, a fluid addition system for internal combustion engines that fully satisfies the objectives, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and scope of the appended claims.

What is claimed is:

1. In a vehicle having an internal combustion engine with an intake system, a throttle control, and a transmission with gearing, apparatus for selectively adding cooling fluid into the intake system comprising:
- a fluid container;
- a filter for filtering fluid passing from said container;
- regulating means regulating addition of the fluid from said container to the intake system, said regulating means having a normally closed control valve allowing fluid flow to the intake system when open and preventing fluid flow to the intake system when closed; wherein said regulating means also includes a second valve, said second valve allowing fluid from said container to flow to the intake system only at high intake manifold vacuum.
- sensing means to sense vehicle operating conditions;
- means responsive to said sensing means to selectively transmit an activating signal to open said control valve; and
- dispersing means positioned in the intake system to disperse within the intake system the fluid from said container which has been allowed to be added to the intake system by said regulating means.

2. Apparatus as set out in claim 1, also including means responsive to vacuum to close said control valve when pressure is removed from the throttle of the internal combustion engine.

3. Apparatus as set out in claim 2, said dispersing means in an ultrasonic atomizer for converting the fluid added to the intake system into a mist.

4. Apparatus as set out in claim 3, also including a pump for aiding flow of fluid from said container to the intake system, said sensing means senses engine temperature and vehicle speed, and said means to selectively transmit an activating signal to open said control valve also governs operation of said pump and said atomizer.

5. Apparatus as set out in claim 2, wherein said second valve of said regulating means also allows fluid from said container to flow to the intake system at low intake manifold vacuum, and wherein said dispersing means is an ultrasonic atomizer for converting the fluid added to the intake system into a mist.

6. Apparatus as set out in claim 5, also including a pump for aiding flow of fluid from said container to the intake system, said sensing means senses engine temperature and vehicle speed, and said means to selectively transmit an activating signal to open said control valve also governs operation of said pump and said atomizer.

7. Apparatus as set out in claim 1, wherein said regulating means also includes a second valve, said second valve allowing fluid from said container to flow to the intake system only at high intake manifold vacuum.

8. Apparatus as set out in claim 1, wherein said regulating means also includes a second valve, said second valve allowing fluid from said container to flow to the intake system only at high or low intake manifold vacuum.

9. Apparatus as set out in claim 1, wherein said dispersing means is an ultrasonic atomizer for converting the fluid added to the intake system into a mist.

10. In a vehicle having an internal combustion engine with an intake system, a throttle control, and a transmission with gearing, apparatus for selectively adding cooling fluid into the intake system comprising:
- a fluid container;
- a filter for filtering fluid passing from said container;
- regulating means regulating addition of the fluid from said container to the intake system, said regulating means having a normally closed control valve allowing fluid flow to the intake system when open and preventing fluid flow to the intake system when closed wherein said regulating means also includes a second valve, said second valve allowing fluid from said container to flow to the intake system only at high intake manifold vacuum;
- sensing means to sense vehicle operating conditions, said sensing means transmitting input signals representative of the conditions sensed;
- input receiving means for receiving input signals from said sensing means, said input receiving means selectively transmitting an activating signal to open said control valve in response to the input signals; and
- dispersing means positioned in the intake system to disperse within the intake system the fluid from said container which has been allowed to be added to the intake system by said regulating means.

11. Apparatus as set out in claim 10, wherein said dispersing means is an ultrasonic atomizer for converting the fluid added to the intake system into a mist.

12. Apparatus as set out in claim 10, wherein said second valve of said regulating means also allows fluid from said container to flow to the intake system at low intake manifold vacuum.

13. Apparatus as set out in claim 12, also including a pump for aiding flow of fluid from said container to the intake system, and wherein said dispersing means is an ultrasonic atomizer for converting fluid added to the intake system into a mist, said input receiving means also activates said pump and said atomizer, and said input receiving means includes means to activate said pump and said atomizer and open said control valve only when all the input signals are representative of all said sensed vehicles operating conditions being in excess of preselected values.

14. Apparatus as set out in claim 13, wherein said sensing means senses engine temperature, engine RPM, intake manifold vacuum, throttle position, and transmission gear position, and wherein said pump is a centrifugal type.

15. Apparatus as set out in claim 13, wherein the internal combustion engine is provided with fuel injectors for fuel injecting the engine and said input receiving means also transmits signals to open the fuel injectors of the engine in response to the input signals from said sensing means.

16. Apparatus as set out in claim 10, also including a pump for aiding flow of fluid from said container to the intake system, and wherein said dispersing means is an ultrasonic atomizer for converting fluid added to the intake system into a mist, said input receiving means also activates said pump and said atomizer, and said input receiving means includes means to activate said pump and said atomizer and open said control valve only when all the input signals are representative of all said sensed vehicle operating conditions being in excess of preselected values.

17. Apparatus as set out in claim 16, wherein said sensing means senses engine temperature, engine RPM, intake manifold vacuum pressure, throttle position, and transmission gear position, and wherein said pump is a centrifugal type.

18. Apparatus as set out in claim 16, wherein the internal combustion engine is provided with fuel injectors for fuel injecting the engine and said input receiving means also transmits signals to open the fuel injectors of the engine in response to the input signals from said sensing means.

19. A method of selectively adding fluid from a fluid container into the intake system of an internal combustion engine incorporated in a vehicle depending upon the vehicle operating conditions comprising the steps of:

sensing vehicle operating conditions;

providing regulating means comprising a normally closed control valve to regulate flow of fluids from the container to the intake system, the control valve allowing flow into the intake system when open and preventing flow of fluid into the intake system when closed wherein said regulating means also includes a second valve, said second valve allowing fluid from said container to flow to the intake system only at high intake manifold vacuum;

transmitting a signal when the vehicle operating conditions sensed are within a specified range to open the control valve, whereby fluid is allowed to be injected from the fluid container into the intake system; and atomizing the fluid added to the intake system from the container into a mist.

20. The method of claim 19, further including the steps of:

selectively pumping the fluid from the fluid container in response to the sensed vehicle operating conditions;

filtering the fluid passing from the fluid container;

providing a normally closed second valve for regulating flow of fluid from the container to the intake system, the second valve preventing flow into the intake system when closed; and opening the second valve in response to intake manifold vacuum.

21. The method of claim 19, wherein the vehicle operating conditions comprise engine temperature and vehicle speed, and the second valve only opens in response to high or low manifold vacuum.

22. The method of claim 19, further including the steps of:

closing the control valve and shutting off the pumping and atomizing when vehicle operating conditions are outside the specified range, and closing said second valve when vacuum is within a specified range of manifold vacuum.

* * * * *